United States Patent
Brown

(10) Patent No.: US 6,462,303 B2
(45) Date of Patent: Oct. 8, 2002

(54) LASER MARKING OF GOLF BALLS

(75) Inventor: Stanley W. Brown, North Attleboro, MA (US)

(73) Assignee: Acushnet Company, Fairhaven, MA (US)

(*) Notice: Subject to any disclaimer, the term of this patent is extended or adjusted under 35 U.S.C. 154(b) by 0 days.

(21) Appl. No.: 09/739,469

(22) Filed: Dec. 18, 2000

(65) Prior Publication Data

US 2001/0047986 A1 Dec. 6, 2001

Related U.S. Application Data

(60) Provisional application No. 60/178,468, filed on Jan. 27, 2000.

(51) Int. Cl.$^7$ ................................................ B23K 15/08
(52) U.S. Cl. .............................. 219/121.69; 219/121.66
(58) Field of Search ....................... 219/121.69, 121.68, 219/121.66, 121.67, 121.6; 156/146

(56) References Cited

U.S. PATENT DOCUMENTS

| | | | |
|---|---|---|---|
| 4,994,639 A | 2/1991 | Dickinson et al. ...... 219/121.69 |
| 5,248,878 A | 9/1993 | Ihara ...................... 219/121.69 |
| 5,334,673 A | 8/1994 | Wu ............................ 273/235 |
| 5,484,870 A | 1/1996 | Wu ............................. 528/28 |
| 5,523,125 A | 6/1996 | Kennedy et al. ............. 427/555 |
| 5,651,741 A | 7/1997 | Masutani et al. ............ 473/200 |
| 5,733,428 A | 3/1998 | Calabria et al. ............. 264/134 |
| 5,770,325 A | 6/1998 | Keller et al. ................. 428/914 |
| 5,888,437 A | 3/1999 | Calabria et al. ............. 264/135 |
| 5,908,358 A | 6/1999 | Wu ............................. 473/378 |
| 5,947,843 A | 9/1999 | Calabria et al. ............. 473/377 |
| 5,966,213 A | * 10/1999 | Shimosaka |
| 6,075,223 A | * 6/2000 | Harrison |
| 6,248,974 B1 | * 6/2001 | Wai |

* cited by examiner

*Primary Examiner*—Tom Dunn
*Assistant Examiner*—Jonathan Johnson
(74) *Attorney, Agent, or Firm*—Swidler Berlin Shereff Friedman LLP

(57) ABSTRACT

The present invention relates to a method for forming indicia on golf balls. More specifically, the present invention is directed toward the use of a low-power $CO_2$ laser beam to machine alphanumeric characters, three-dimensional figures, machine-readable coded markings and the like into golf ball covers, without significant discoloration of the exposed cover layer. In the present method, surface material is physically removed, or ablated, from the golf ball cover, leaving an image engraved or machined within the cover layer. The present method, which employs a deflected-beam, computer-controlled laser source, is flexible and readily and easily adapted to the formation of various indicia on the surface of golf balls. Covers machined using this process may be coated with one or more layers of opaque paint, and may be further sealed, as necessary or desired, with one or more transparent layers.

30 Claims, No Drawings

LASER MARKING OF GOLF BALLS

CROSS REFERENCE TO RELATED APPLICATION

This application claims priority to U.S. Provisional Application Serial No. 60/178,468, filed Jan. 27, 2000, which is hereby incorporated by reference, in its entirety.

FIELD OF THE INVENTION

The present invention relates to a method for forming indicia on golf balls. More specifically, the present invention is directed toward the use of a laser beam to form indicia, such as alphanumeric characters, three-dimensional figures, machine-readable coded markings, and the like, on golf ball covers by ablating surface material from the ball.

BACKGROUND OF THE INVENTION

Golf ball covers are routinely marked with various surface indicia, such as the manufacturer's logo and trademark, and the play number, which allows golfers using the same type of golf ball to distinguish one player's ball from that of another. Additional symbols that may also be applied to golf balls include custom figures for promotional purposes as well as specific marks reflecting manufacturing information. These indicia are generally printed to the painted surface of a golf ball using one of a number methods that have been adapted for use with curved surfaces, including pad, stamping, and transfer-tape printing methods.

In the majority of instances, logos and trademarks are applied to golf balls using pad printing processes and equipment. Pad printing employs an etched image plate (i.e., the cliché) having a negative etching of the desired image. The image plate, typically, is made of a tough material such as metal, steel, other alloy or photopolymer, which normally has a uniform thickness except for the area defining the negative etched image. The plate may optionally be coated with one or more protectant layers or materials, to enhance its useful life. Typically, the depth of the etched image is from about 5 microns to about 30 microns or any value therebetween.

During pad printing, ink is applied to the image plate, thus filling the etched image. Excess ink is then scraped off the image plate, leaving behind ink only within the etched image. A printing pad is then momentarily lowered and pressed onto the inked image plate to lift ink from the ink-filed etched image onto the printing pad. The ink so lifted defines the shape of the etched image. The inked pad is then momentarily lowered and pressed onto the golf ball, thereby releasing the ink from the pad, onto the spherical surface of the ball, thereby forming an image corresponding to that of the etched cavity. Ink deposited on a golf ball may be cured by heating or by exposure to ultraviolet radiation, depending on the composition of the ink. One example of a pad-printing method employing a UV-curable ink is provided by U.S. Pat. No. 5,770,325 to Keller et al., which discloses an ink composition comprising a UV-curable resin, a colorizing agent, such as a pigment or dye, and a photo-initiator for initiating polymerization of the UV-curable resin.

Other, less frequently used methods for marking golf balls include tape printing and stamp printing. Tape printing involves the use of a heated element corresponding to the image to be transferred, which is applied with pressure to an inked tape held against the surface to be marked. Similarly, stamp printing methods may involve either pressing an inked stamp directly against the surface to be marked or forcing a stamp against an inked sheet placed between the stamp and the surface of the ball. In both instances, obtaining sharp, well-defined images, without affecting the physical properties of the golf ball, can be difficult.

A serious concern that is common to each of these methods, is the durability of the printed images formed. The cured ink not only must adhere tenaciously to the surface to which it is applied, but it also must be sufficiently flexible and resilient to remain on that surface as the golf ball is compressed and distorted upon being struck by a golf club. Therefore, although it is possible to apply images to the outermost surface of a golf ball using these printing methods, in practice, one or more protective layers of transparent coatings, or "topcoats," are often applied over such indicia.

Alternative methods for the application of indicia to golf balls have been described, which use lasers to form marks upon the outer surface. For example, U.S. Pat. No. 5,248,878 to Ihara ("the '878 patent") discloses laser irradiation of a portion of a golf ball cover under certain conditions resulting in a color change in the surface layer portion which is contacted by the laser. Once a mark is formed by the method of the '878 patent, an opaque coat of paint cannot be applied to the surface of the ball without covering the previously-developed mark.

Holography may be defined as a method of producing a three-dimensional image of an object by recording, on a photographic plate or film, the interference pattern formed upon exposure of the object by a split laser beam. The three-dimensional holographic image is then observed upon illumination of that recorded interference pattern, which is generally carried upon a reflective surface, with, for example, visible light. U.S. Pat. No. 5,651,741 to Masutani et al. ("the '741 patent") provides a method for forming surface indicia on a golf ball employing laser-created holographic images. The '741 patent discloses, in one embodiment, a hologram formed by recoding, on a suitable recording material, the intensity distribution of interference fringes corresponding to the interference pattern created by superimposing a wave front reflected from or transmitted through an object with a reference wave front. In another embodiment, the '741 patent discloses the application of a metal film or foil bearing a hologram, to a golf ball surface. However, once a hologram is applied to the surface of the golf ball, that surface cannot be covered with another coat of an opaque paint without obscuring the indicia previously applied.

In an alternative embodiment of the '741 patent, a hologram recording material is applied to the golf ball surface and the hologram is recorded on that material using a laser beam. In still another embodiment disclosed in the '741 patent, the hologram is formed on the inner surface of a molding die and transferred to the cover as it is formed in that mold. The '741 patent also indicates that holographic images may be created by optical interference patterns generated by light reflected from the surface of a golf ball carrying a grid of fine depressions and protrusions of a submicron order which have been formed on the cover surface of a golf ball. Similarly, the '741 patent also discloses generation of images on the surface of a golf ball, which are produced as optical interference patterns generated upon illumination a region comprising sections having different light transmission properties. These sections may be created within a transparent surface layer by partial laser irradiation in those instances where that irradiation causes a physical change in the exposed, transparent layer, which affects its ability to transmit light.

Although each of the above-identified methods may have a specific application for forming indicia on the surface of a golf ball, none is wholly satisfactory. Marking procedures which print images on golf ball covers require rapidly curable, strongly adherent, and resilient ink compositions to be practical. Similarly, methods, similar to those described above employing lasers for marking golf ball covers either depend upon the discovery of a suitable, empirically-determined set of conditions, which create visually detectable surface discolorations or depend upon the generation of holographic images generated by complex optical interference patterns.

Furthermore, these procedures are not well suited for, nor readily adapted to manufacturing processes employing continuous piece numbering. Accordingly, a long-felt need has existed for a labeling process that would provide a means to distinguish golf balls, using either visible marks or, in preferred embodiments, machine-readable marks, both before and after the application of one or more layers of opaque paint. Such a method, which would provide a unique identifier for each ball that is linked, for example, to the specific manufacturing history of that ball, would be particularly useful in large-scale production processes, where it would have immediate applications for, inter alia, quality control, inventory systems, and sorting operations.

Accordingly, there is a long-felt need for a golf ball marking procedure that will avoid either the inflexibility, or the complexity and expense, inherent in prior art methods for forming indicia on golf ball surfaces. The laser-marking procedures of the present invention provide a solution to these unmet needs.

SUMMARY OF THE INVENTION

The present invention is directed toward a method for marking a golf ball having a cover where the mark is formed by directing a laser beam onto a portion of the cover whereby material comprising the cover is ablated. In the present method, the laser used provides radiation having a wavelength which is strongly absorbed by at least one component of the cover so that material is removed from the surface in the absence of significant melting or discoloration of the surrounding surface layer. That is, the image formed by the method of the present invention is not detected as a consequence of such changes in surface appearance, rather indicia are created by the removal of material, leaving a machined or engraved image within the cover layer of the marked golf ball.

In another aspect of the present invention, a golf ball carrying the image formed by laser ablation of surface material is coated with at least one layer of opaque paint, which would obviate images formed using prior art methods, which are provided by surface discolorations and the like.

In a further aspect of the present invention, the laser source, which is used to mark a golf ball having a polyurethane cover, provides laser radiation within the infrared waveband. In a preferred embodiment, the laser radiation has a wavelength within the range of from about 9 microns to about 11 microns, and in a more preferred embodiment, a wavelength of about 10.6 microns. Accordingly, in a preferred configuration of the present golf ball marking procedure, a $CO_2$ laser, which may be a tunable $CO_2$ laser, is employed as the source of laser radiation.

In still another aspect of the present invention, the laser beam is controlled by a computer, which is programmed not only to allow deflection of the laser beam in two and three dimensions as it is applied to the surface of the golf ball cover, but also to control the dwell time of the laser beam at each point on the irradiated surface, thereby controlling the amount of surface material ablated at that point and, consequently, establishing the depth of the mark formed within the cover layer. In a preferred aspect of the present marking procedure, the computer is programmed in such a manner that the laser beam is directed toward the golf ball surface so as to form a detectable image which comprises a plurality of markings having pre-determined length, width and depth.

In other preferred aspects of the present marking method, the image formed in the cover layer of a golf ball may comprise alphanumeric characters, machine-readable coded markings, line codes, logos, and combinations thereof.

In another preferred aspect of the present invention, the golf ball cover comprises polyurethane. In still another preferred aspect of the invention, the polyurethane used in the formation of the cover is a product of the reaction between a polyurethane prepolymer and a curing agent with the polyurethane prepolymer being a product formed by the reaction between a polyol and a diisocyanate. Preferably the prepolymer, in turn, is a product formed by the reaction between 4,4'-diphenylmethane diisocyanate and a polyether type polyol and wherein the curing agent is polytetramethyleneoxide-di-p-aminobenzoate The present invention also contemplates a golf ball marked by the method disclosed herein.

DETAILED DESCRIPTION OF THE PREFERRED EMBODIMENTS

As used herein, references to indicia, marks and the like that are formed "on the surface" of a golf ball, include those that are, literally, machined into that cover by ablation of material making up the cover. Also as used herein, ablation refers to a process whereby cover materials are vaporized, evaporated, burned, or otherwise removed from the cover upon exposure to an appropriate source of laser radiation, unaccompanied by significant levels of melting or discoloration of the surrounding surface.

As used herein in the context of "radiation strongly absorbed by at least one component of the cover," the phrase strongly absorbed means that a sufficient amount of radiation is absorbed such that material is ablated from the surface of the irradiated target, without significant discoloration or melting of that surface.

The golf ball marking method of the present invention employs a laser beam to ablate material from the irradiated portions of a golf ball cover to an extent sufficient to form an identifiable mark on the surface of the ball without producing significant discoloration of the irradiated surface. The procedure may be performed with any source of laser light, provided that the combination of the wavelength of the laser radiation and the chemical composition of the golf ball cover allow the ablation of surface material without significant discoloration. Accordingly, the present invention may be used to mark suitable covers of two piece golf balls, wound golf balls and multilayer golf balls. Two piece golf balls comprise a cover and a core, while multilayer golf balls comprise a cover, a center and one or more mantle layers disposed between the cover and the center. The center of a multilayer golf ball may be a solid center or a liquid center. Wound golf balls comprise a cover and a center, which may be a solid or liquid center, and a layer of elastic windings disposed between the center and the cover. For the purposes of this invention, the term cover is intended to include the outer surface of one piece or solid balls as well as the discrete outer cover layer applied to two piece, wound and multilayer golf balls.

Applicants believe, without wishing to be held to that belief, that within the present laser-marking method, at least one component of the cover composition is characterized by a high molar extinction or absorption coefficient at a wavelength corresponding to that of the applied laser beam. Accordingly, a substantial amount of the impinging radiation is absorbed in a relatively small region at the surface of the ball, resulting in ablation of that material. This phenomenon lies in contrast to the general heating or even melting which occurs where the impinging radiation is relatively poorly absorbed at the surface and, consequently the energy of the laser is dissipated over a much greater mass or area of the ball. Therefore, although the present invention discloses specific combinations of laser and substrate surface, it would be apparent to those of ordinary skill that other combinations of cover compositions and lasers, having lasing bands at specific wavelengths, would be equally suitable.

For example, a tunable $CO_2$ laser could be employed and each band could be examined in turn for those capable of machining legible characters into a test cover material without significant discoloration. Similarly, and in parallel, one of ordinary skill would obtain and analyze infrared absorption spectra for appropriate cover compositions and compare these to the wavelength provided by different lasers or laser lines, and choose the source providing radiation of a wavelength corresponding to an infrared absorption peak of the cover material. In this manner the ordinarily skilled artisan will devise parallel methods for laser marking of golf balls in which the mark is created by ablation of surface material, without significant discoloration, and which may be formed prior to the application of one or more layers of opaque paint.

As used herein, "without significant discoloration" and "without significant melting" mean that any such changes in the material surrounding the ablated portion will not provide a legible mark, as perceived by the ordinary observer. Furthermore, any such changes in the surface surrounding the ablated portion would not be detectable by the ordinary observer upon the application of one or more layers of opaque paint to the surface of the laser-marked ball.

A laser suitable for use in the present method is one providing radiation within the infrared waveband. More specifically, where polyurethane covers are to be marked, the preferred laser is a $CO_2$ laser. Such lasers comprise two mirrored surfaces: a first mirrored surface having essentially 100% reflectance and a second, physically opposed, partially reflective mirror through which coherent laser radiation, having a wavelength of from about 9 to about 11 microns, may pass. As is well known to those in the art, in a "tunable" laser, the first mirror is replaced with a diffraction grating, allowing the device to lase on any one of over 100 separate laser lines or transitions that produce light at wavelengths within the range of from about 9 microns to about 11 microns.

Analysis of the infrared absorption spectra of other materials used in the formation of golf ball covers, including balata and ionomeric compounds, reveals a number of absorption peaks within the range of from about 5 microns to about 15 microns. Accordingly, irradiation of golf ball covers formed from these materials with a laser source having a wavelength corresponding to an absorption peak of such a material can lead to ablation of that material from the irradiated surface. Therefore by matching radiation absorption properties of the cover material with a laser source providing the corresponding wavelength absorbed, one of ordinary skill in the art will be able to develop other combinations of cover material and laser source for marking golf ball covers in accordance with the present invention.

Therefore, the present method may be used to mark any type of golf ball comprising a cover layer formed from a composition that may be engraved or "machined" with a laser beam to form indicia on the surface of the ball that will remain visible upon the application of at least one layer of opaque paint to the surface of the golf ball. Golf balls having laser-markable covers that are contemplated as substrates for the present invention include two-piece, three-piece, wound, and multilayer golf balls, having covers formed from conventional and non-conventional materials.

The selection of a suitable cover is readily determinable, as described above, by those of ordinary skill in the art in light of the present disclosure. The cover is preferably a single layer having a thickness of about 0.02 to 0.08 inches, preferably about 0.03 to about 0.07 inches, and more preferably about 0.04 to about 0.06 inches. One example of preferred ball dimensions according to the invention is a golf ball comprising a core center having a 1.58 inch diameter, where the core may further comprise, a center having a diameter of 1.13 inches and a mantle layer having a thickness of 0.225 inches, encased with a cover having a thickness of 0.05 inches to provide a golf ball having an overall diameter of 1.68 inches.

Laser-markable golf ball covers useful in the disclosed procedure are preferably formed as a single layer having a thickness of about 0.02 to about 0.08 inches, preferably about 0.03 to about 0.07 inches, and more preferably about 0.04 to about 0.06 inches. Preferred covers for the laser-marking method of the present invention are formed from polyurethanes. Suitable materials, methods and equipment for the formation of polyurethane golf ball covers are disclosed in U.S. Pat. Nos. 5,334,673, 5,733,428 and 5,888,437, each of which is incorporated herein by reference, in its entirety. Thermoplastic polyurethanes useful for making golf ball covers which may be laser-marked according to the invention may be made from a diisocyanate, such as 4,4'-diphenylmethane diisocyanate (MDI), 3,3'-dimethyl-4-4'-biphenylene diisocyanate (TODI), or para-phenylene diisocyanate (PPDI), reacted with a polyol and cured with a diol, such as 1,4-butanediol. Polyurethane covers formed in accordance with the present invention are the product of a polyurethane prepolymer cured with a curing agent such as a diamine or a glycol. The prepolymer, in turn, is the product of a reaction of a polyol and a diisocyanate. Suitable polyurethane prepolymers for use in the present invention are formed from a polyol, such as polyether, polyester or polylactone, and a diisocyanate. Suitable diisocyanates for use in the present invention include 4,4'-diphenylmethane diisocyanate (MDI) or 3,3'-dimethyl-4-4'-biphenylene diisocyanate (TODI).

Suitable polyether polyols include polytetramethylene ether glycol; polyoxypropylene glycol; and polybutadiene glycol. Suitable polyester polyols include polyethylene adipate glycol; polyethylene proplyene adipate glycol; and polybutylene adipate glycol. Suitable polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone.

Suitable curatives for use in the present invention are selected from the polyamine group consisting of 3,5- dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate; or a difunctional glycol; and mixtures thereof. 3,5-Dimethylthio-2,4-toluenediamine and 3,5-dimethylthio-2,6-toluenediamine are isomers and are sold under the trade name ETHA-CURE® by Ethyl Corporation. Trimethylene glycol-di-p-aminobenzoates are sold under trade names POLAMINES® by Polaroid Corporation. N,N'-dialkyldiamino diphenyl methane is sold under the trade name of UNILINK® by UOP. Suitable difunctional glycols are 1,4-butanediol; 1,3-butanediol; 2,3-butanediol; 2,3-dimethyl-2,3-butanediol; dipropylene glycol; and ethylene glycol.

Polyurethane covers useful in the present invention preferably have a hardness of about 40 to about 70 Shore D, and, more preferably, a hardness of about 45 to about 60 Shore D.

Alternatively, other useful cover materials include, but are not limited to thermoplastics such as appropriate ethylene-based or propylene-based homopolymers, copolymers and block copolymers. These homopolymers, copolymers and block copolymers may include functional monomers such as acrylic and methacrylic acid, fully or partially neutralized ionomers and their blends, methyl acrylate, methyl methacrylate homopolymers and copolymers, and the like. Any of these polymers or copolymers may be further reinforced by blending with a wide range of density-modifying fillers, including foaming agents or glass spheres. Regardless of the materials included, the cover should have a Shore D hardness from about 40 to about 75, preferably from about 50 to about 70 more preferably from about 50 to about 65. One way to achieve this hardness is to include a very low modulus ionomer ("VLMI") in an amount up to about 70 weight percent. A variety of other suitable conventional cover blends are acceptable substrates for laser-marking by the present method, provided the blend, when exposed to laser radiation, is ablated without significant discoloration. The selection of a suitable cover, and application thereof over the intermediate layer or a core, will be readily determinable by those of ordinary skill in the art when considering the disclosure herein.

The present method also contemplates, in another embodiment, golf ball cover compositions comprising at least one additive characterized by strong absorption within the infrared waveband, whereby covers formed of those compositions are laser-marked by ablation of the cover material without significant discoloration.

Another example of a cover composition includes 30 weight percent Surlyn® 8320 (VLMI); 40 weight percent Surlyn® 7940; 20 weight percent Surlyn® 8940 and 10 weight percent Surlyn® 8660. This cover composition will also include 5 weight percent (calculated relative to the total weight of the ionomer blend) of a filler, such as SU 1140—a blue/white concentrate, used for coloring. The Surlyn® 8320, 7940, 8940, and 8660 are trade names of materials commercially available from DuPont de Nemours & Company, Inc., of Wilmington, Del., while SU 1140 is a trade name of Polymer Concentrates Incorporated. The cover may be applied, for example, by compression molding. A cover prepared using the appropriate amount of VLMI according to this formulation should have a hardness from about 50 to 70 Shore D, preferably from about 55 to 68 Shore D, more preferably from about 60 to 65 Shore D.

Similarly, golf ball covers that may be laser-marked using the present method include those formed from polyurea-based compositions, for example as disclosed in U.S. Pat. No. 5,484,870, which is incorporated herein by reference, or epoxy-urethane-based compositions as disclosed in U.S. Pat. No. 5,908,358, which is incorporated herein by reference.

Golf ball covers to be marked according to the present method, may be applied to a ball core, for example, by injection molding, reaction injection molding or compression molding. When compression molding is used, the cover or cover layer may be pre-formed as ellipsoidal or hemispherical half shells using conventional compression or injection molding techniques. Cover half shells are then molded under conditions well known to those in the art.

The nature and character of the surface indicia formed using the present laser-marking method may be manipulated by varying power and wavelength of the laser used, and the duration, or "dwell time," of exposure of the surface to the light source, and as noted above, the chemical composition of that substrate. A low-power $CO_2$ laser, providing coherent infrared radiation having a wavelength of about 10.6 microns, is a preferred laser source in the present marking procedure where the ball to be marked has a polyurethane cover, with the laser having a average power rating of between about 5 watts and 50 watts, preferably between about 10 watts and 40 watts, and more preferably between about 20 watts and 30 watts. A preferred laser has a frequency of about 5 kilohertz. Similar tunable laser sources which provide infrared laser radiation bands or lines having a wavelength of from about 9 microns to about 11 microns are also useful in the laser-marking methods disclosed herein.

Exposure of the substrate may be carried out for any suitable period with the range of from about 0.01 to about 20 seconds and will depend on the complexity, breadth and depth of the mark to be formed in the cover of the golf ball. The dimensions of the machined indicia formed using the present method are varied according to the specific application, and such dimensions may be larger if they are intended to be read visually or considerably smaller in those instances where the marks are intended to be machine read. Generally, by way of non-limiting illustration, alphanumeric characters that are machined into the cover layer of a golf ball in the present method are formed within a rectangular region having a length of from about 0.01 inch to about 0.25 inch, preferably from about 0.025 inch to about 0.2 inch, and more preferably from about 0.05 inch to about 0.15 inch; similarly the width of the rectangle is from about 0.005 inch to about 0.125 inch, preferably from about 0.0125 inch to about 0.1 inch, and more preferably 0.025 inch to about 0.075 inch. The width of a mark formed on the surface of the golf ball according to the present invention may be from about 0.008 inch to about 0.020 inches.

A golf ball may be marked using the present method at any point after the cover has been formed over the core, either before or after the ball is painted and where desired, before or after the surface is sealed with one or more clear coats.

In a preferred aspect, the desired indicia are applied to the cover layer before paint is applied to the surface. This may be particularly advantageous for example, where it is desirable to be able to distinguish, identify, and eventually sort individual golf balls with respect to their composition and manufacturing history after application of one or more layers of opaque paint to the cover of a mixed population of golf balls.

In another preferred aspect of the present laser-marking process, the laser apparatus is a deflected-beam device, where the direction of the laser beam is determined by the relative position and orientation of a plurality of mirrors disposed between the laser source and a focusing lens. In the preferred aspect, movement of the mirrors is controlled by a computer allowing rapid movement of the beam as it impinges upon the substrate, thereby providing the means to form detailed characters, machine-readable coded markings, line codes, and images on the surface of a golf ball.

Indicia formed on the surface of golf balls according to the present method include three-dimensional images that may be formed using the preferred deflected-beam laser source. These images are created by varying the duration of exposure of the target surface to the laser beam, and therefore the degree of ablation of surface material and the depth of the mark formed thereby, as that laser beam is directed, for example scanned according to a pre-determined two- or three-dimensional pattern, across the golf ball cover. The depth of images and indicia machined into the golf ball cover using the present method is limited by the thickness of the cover layer. Accordingly, the depth to which is image may be machined into the cover typically lies within the range of from about 0.001 to about 0.08 inches, preferably about 0.005 to about 0.07 inches, and more preferably about 0.01 to about 0.06 inches.

In yet another aspect of the present invention, code markings, line codes and the like may be machined into the surface of the golf ball in such a manner as to comprise a machine-readable image. Such machine-readable marking codes may be applied, in one preferred embodiment where the outer layer of the golf ball is a thermoset or thermoplastic cover formed in a mold comprising a pair of mold halves. Generally, a thermoset or thermoplastic cover is applied to a golf ball core within a two-part mold, where each mold half includes a hemispherical concave surface. In one such process, disclosed in U.S. Pat. Nos. 5,733,428 and 5,888,437 which are incorporated herein by reference in their entirety, a portion of a thermoset cover composition is introduced into a first hemispherical "cup" held within a square mold half, and the golf ball core is precisely lowered into this composition as it solidifies. When the composition has polymerized sufficiently to support the golf ball center, this first mold half is first inverted and then mated with a second mold half having a second hemispherical cup containing a second portion of the cover composition. Once the cover has polymerized, forming a single-piece cover encasing the core, the mold is opened and the golf ball removed. In a modification of this method, the golf ball is laser-marked at the point in the manufacturing process after the mold has been opened and one mold half removed but before the covered ball is extracted from the other mold half. Accordingly, this leaves the ball firmly positioned in a mold half which is then readily positioned accurately and reproducibly with respect to the laser beam. In this embodiment, the mark is applied to a pre-determined location on the cover, which may, for example, be defined in relation to the equatorial line corresponding to the contact surface existing between the two mold halves.

In a further aspect of this method the inner surface of at least one of the mold halves, which are constructed so as to introduce a dimple pattern on the cover, will also include one or more uniquely-shaped indentations or protrusions such that the cover produced will carry one or more additional surface mark common to golf ball covers formed in that mold. These additional, uniquely shaped marks serve as orientation points that allow precise and accurate spatial placement of the laser-marked golf ball relative to a reading device, and, thereby facilitate detection and interpretation of unique, machine-readable line codes that are machined within the cover layer by the laser beam.

The present invention is not limited in scope by the specific embodiments disclosed in these examples which are intended to illustrate the most preferred embodiments of the invention. Indeed, various modifications of the invention or other embodiments which are functionally equivalent to those shown and described herein will become apparent to those skilled in the art.

What is claimed is:

1. A method for marking a golf ball having a cover, comprising the steps of:
   directing a beam of laser radiation onto a portion of the cover;
   irradiating the cover portion, wherein the irradiated cover portion is ablated to form a detectable mark.

2. The method of claim 1, wherein the laser radiation has a wavelength strongly absorbed by at least one component of the cover.

3. The method of claim 1, wherein the mark is formed without significant discoloration of the cover.

4. The method of claim 1, wherein the laser radiation has a wavelength in the infrared waveband.

5. The method of claim 4, wherein the laser radiation has a wavelength within the range of from about 9 microns to about 11 microns.

6. The method of claim 5, wherein the laser radiation has a wavelength of about 10.6 microns.

7. The method of claim 1, wherein the laser radiation is provided by a $CO_2$ laser.

8. The method of claim 1, wherein the laser radiation is provided by a tunable laser.

9. The method of claim 8, wherein the tunable laser is a $CO_2$ laser.

10. The method of claim 1, wherein the laser radiation is provided by a deflected-beam laser source having a average power rating of between about 5 watts and 50 watts.

11. The method of claim 10, wherein the laser source has a average power rating of between about 10 watts and 40 watts.

12. The method of claim 11, wherein the laser source has a average power rating of between about 20 watts and 30 watts.

13. The method of claim 1, further comprising the step of applying at least one layer of an opaque paint to the cover after forming the detectable mark.

14. The method of claim 1, wherein the step of directing the beam of laser radiation is controlled by a computer.

15. The method of claim 14, wherein the computer is programmable so as to direct the laser beam according to a predetermined pattern and according to a predetermined dwell time, so as to form a detectable image on the cover, wherein the image comprises markings having predetermined length, width and depth.

16. The method of claim 15, wherein the image is selected from the group consisting of alphanumeric characters, machine-readable coded markings, line codes, logos, and combinations thereof.

17. The method of claim 1, wherein the cover comprises polyurethane.

18. The method of claim 17, wherein the polyurethane is a product of the reaction between a polyurethane prepolymer and a curing agent with the polyurethane prepolymer being a product formed by the reaction between a polyol and a diisocyanate.

19. The method of claim 18, wherein the prepolymer is product formed by the reaction between 4,4'- diphenylmethane diisocyanate and a polyether type polyol and wherein the curing agent is polytetramethyleneoxide-di-p-aminobenzoate.

20. A golf ball marked by the process of claim 1.

21. The method of claim 1, wherein the laser radiation is provided by a laser source having a frequency of about 5 kilohertz.

22. A method for marking a golf ball comprising the steps of:
   providing a golf ball having a cover thereon;
   irradiating at least a portion of the cover; and
   ablating a predetermined portion of cover material to form an identifiable mark on the golf ball, wherein no significant discoloration of the cover portion results therefrom.

23. The method of claim 22, wherein the step of ablating comprises vaporizing, evaporating, burning, removing, engraving, machining, or a combination thereof.

24. The method of claim 22, further comprising the step of applying at least one coating layer to the cover.

25. The method of claim 24, wherein the step of applying at least one coating layer occurs prior to the step of irradiating at least a portion of the cover.

26. The method of claim 24, wherein the step of applying at least one coating layer occurs after the step of ablating a predetermined portion of cover material to form an identifiable mark on the golf ball.

27. The method of claim 22, wherein the step of providing a golf ball comprises the steps of:
   forming a cover from a composition having an infrared absorption from about 5 microns to about 15 microns.

28. A method for marking a golf ball, comprising the steps of:
   providing a golf ball having a cover;
   directing a laser beam toward at least a portion of the cover; and
   irradiating the at least a portion of the cover, wherein the step of irradiating comprises the step of:
      ablating predetermined cover material from the golf ball, wherein the ablation comprises vaporizing, evaporating, burning, removing, engraving, machining, or a combination thereof.

29. The method of claim 28, wherein the step of irradiating occurs without significant discoloration of the surface, heating of the surface, significant melting of the surface, or any combination thereof.

30. The method of claim 28, further comprising the step of applying at least one coating layer to the cover.

* * * * *